United States Patent
Ye et al.

(10) Patent No.: US 10,380,413 B2
(45) Date of Patent: Aug. 13, 2019

(54) SYSTEM AND METHOD FOR POSE-INVARIANT FACE ALIGNMENT

(71) Applicant: Robert Bosch GmbH, Stuttgart (DE)

(72) Inventors: Mao Ye, San Jose, CA (US); Liu Ren, Cupertino, CA (US); Amin Jourabloo, East Lansing, MI (US)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 15/649,230

(22) Filed: Jul. 13, 2017

(65) Prior Publication Data
US 2019/0019014 A1  Jan. 17, 2019

(51) Int. Cl.
G06K 9/00 (2006.01)
G06T 7/73 (2017.01)
(Continued)

(52) U.S. Cl.
CPC ..... *G06K 9/00288* (2013.01); *G06K 9/00208* (2013.01); *G06K 9/00228* (2013.01);
(Continued)

(58) Field of Classification Search
CPC ........... G06K 9/00288; G06K 9/00221; G06K 9/00281; G06K 9/00208; G06K 9/00248; G06K 9/00275; G06K 9/00302; G06K 9/6256; G06K 2009/00322; G06T 2207/20081; G06T 2207/20084; G06T 2207/30201; G06T 7/75
See application file for complete search history.

(56) References Cited

U.S. PATENT DOCUMENTS

| 7,848,548 B1* | 12/2010 | Moon | G06K 9/00281 382/100 |
| 8,401,248 B1* | 3/2013 | Moon | G06Q 30/0242 382/103 |

(Continued)

FOREIGN PATENT DOCUMENTS

EP  2869239  5/2015

OTHER PUBLICATIONS

A. Wagner, J. Wright, A. Ganesh, Z. Zhou, H. Mobahi and Y. Ma, "Toward a Practical Face Recognition System: Robust Alignment and Illumination by Sparse Representation," IEEE Transactions on Pattern Analysis and Machine Intelligence, vol. 34, No. 2, Feb. 2012, pp. 372-386.

(Continued)

*Primary Examiner* — Ali Bayat
(74) *Attorney, Agent, or Firm* — Kathy K. Takeguchi; Maginot Moore & Beck LLP

(57) ABSTRACT

A computing system includes a processing system with at least one processing unit. The processing system is configured to execute a face alignment method upon receiving image data with a facial image. The processing system is configured to apply a neural network to the facial image. The neural network is configured to provide a final estimate of parameter data for the facial image based on the image data and an initial estimate of the parameter data. The neural network includes at least one visualization layer, which is configured to generate a feature map based on a current estimate of the parameter data. The parameter data includes head pose data and face shape data.

17 Claims, 6 Drawing Sheets

(51) Int. Cl.
 G06K 9/62 (2006.01)
 G06K 9/74 (2006.01)
(52) U.S. Cl.
 CPC ..... *G06K 9/00248* (2013.01); *G06K 9/00275* (2013.01); *G06K 9/00302* (2013.01); *G06K 9/621* (2013.01); *G06K 9/6256* (2013.01); *G06K 9/6274* (2013.01); *G06K 9/74* (2013.01); *G06T 7/75* (2017.01); *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 9,396,415 | B2 | 7/2016 | Chertok et al. |
| 9,400,922 | B2 | 7/2016 | Zhou et al. |
| 2008/0298643 | A1* | 12/2008 | Lawther ............ G06F 17/30256 382/118 |
| 2009/0185723 | A1* | 7/2009 | Kurtz ................ G06K 9/00288 382/118 |
| 2016/0379041 | A1 | 12/2016 | Rhee et al. |
| 2018/0181809 | A1* | 6/2018 | Ranjan .................. G06T 7/11 |
| 2018/0211099 | A1* | 7/2018 | Ranjan ............... G06K 9/00248 |
| 2018/0239975 | A1* | 8/2018 | Tamrakar ........... G06K 9/00845 |

OTHER PUBLICATIONS

V. Bettadapura, "Face Expression Recognition and Analysis: The State of the Art," Cornell University Library, arXiv preprint arXiv:1203.6722, Mar. 30, 2012, 27 pages.
J. Roth, Y. Tong and X. Liu, "Adaptive 3D Face Reconstruction from Unconstrained Photo Collections," IEEE Conference on Computer Vision and Pattern Recognition, 2016, pp. 4197-4206.
X. Cao, Y. Wei, F Wen and J. Sun, "Face Alignment by Explicit Shape Regression," International Journal of Computer Vision, 2014, vol. 107, Issue 2, pp. 177-190.
T. Cootes, G. Edwards and C. Taylor, "Active Appearance Models," IEEE Transactions on Pattern Analysis and Machine Intelligence, vol. 23, No. 6, Jun. 2001, pp. 681-685.
D. Cristinacce and T. Cootes, "Boosted Regression Active Shape Models," British Machine Vision Conference, BMVC 2007 doi: 10.5244/C.21.79, 10 pages.
J. Saragih, S. Lucey and J. Cohn, "Face Alignment Through Subspace Constrained Mean-Shifts," IEEE Conference on Computer Vision (ICCV), 2009, pp. 1034-1041.
X. Xiong and F. De La Torre, "Supervised Descent Method and its Applications to Face Alignment," IEEE Conference on Computer Vision and Pattern Recognition, 2013, 8 pages.
A. Jourabloo and X. Liu, "Large-pose Face Alignment via CNN-based Dense 3D Model Fitting," IEEE Conference on Computer Vision and Pattern Recognition, 2016, pp. 4188-4196.
F. Liu, D. Zeng, Q. Zhao and X. Liu, "Joint Face Alignment and 3D Face Reconstruction," European Conference on Computer Vision, 2016, pp. 545-560.
J. McDonagh and G. Tzimiropoulos, "Joint Face Detection and Alignment with a Deformable Hough Transform Model," European Conference on Computer Vision, 2016, pp. 569-580.
R. Zhao, Y. Wang, F. Benitez-Quiroz, Y. Liu and A. Martinez, "Fast and Precise Face Alignment and 3D Shape Reconstruction from a Single 2D Image," European Conference on Computer Vision, 2016, 14 pages.
X. Zhu, Z. Lei, X. Liu, H. Shi and S. Li, "Face Alignment Across Large Poses: A 3D Solution," IEEE Conference on Computer Vision and Pattern Recognition, 11 pages.
S. Zhu, C. Li, C. Loy and X. Tang, "Unconstrained Face Alignment via Cascaded Compositional Learning," IEEE Conference on Computer Vision and Pattern Recognition, 2016, 9 pages.
G. Trigeorgis, P. Snape, M. A. Nicolaou, E. Antonakos and S. Zafeiriou, "Mnemonic Descent Method: A recurrent process applied for end-to-end face alignment," IEEE Conference on Computer Vision and Pattern Recognition, 2016, pp. 4177-4187.
H. Caesar, J. Uijlings and V. Ferrari, "Region-based semantic segmentation with end-to-end training," European Conference on Computer Vision, 2016, 17 pages.
M. Jaderberg, K. Simonyan, A. Zisserman and K. Kavukcuoglu, "Spatial Transformer Networks," Advances in Neural Information Processing Systems, 15 pages.
Y. Sun, X. Wang and X. Tang, "Deep Convolutional Network Cascade for Facial Point Detection," IEEE Conference on Computer Vision and Pattern Recognition, 2013, 8 pages.
J. Zhang, S. Shan, M. Kan and X. Chen, "Coarse-to-Fine Auto-Encoder Networks (CFAN) for Real-Time Face Alignment," European Conference on Computer Vision, 2014, 16 pages.
H. Mohammadzade and D. Hatzinakos, "Iterative Closest Normal Point for 3D Face Recognition," IEEE Transactions on Pattern Analysis and Machine Intelligence, vol. 35, Feb. 2013, pp. 381-397.
P. Paysan, R. Knothe, B. Amberg, S. Romdhani and T. Vetter, "A 3D Face Model for Pose and Illumination Invariant Face Recognition," International Conference on Advanced Video and signal based surveillance, 2009, 6 pages.
C. Cao, Y. Weng, S. Zhou, Y. Tong and K. Zhou, "FaceWarehouse: A 3D Facial Expression Database for Visual Computing," IEEE Transactions on Visualization and Computer Graphics, vol. 20, 2014, 11 pages.
K. He, X. Zhang, S. Ren and J. Sun, "Deep Residual Learning for Image Recognition," IEEE Conference on Computer Vision and Pattern Recognition, 12 pages.
V. Blanz and T. Vetter, "Face Recognition Based on Fitting a 3D Morphable Model," IEEE Transactions on Pattern Analysis and Machine Intelligence, vol. 25, No. 9, Sep. 2003, 12 pages.
X. Yu, J. Huang, S. Zhang, W. Yan and D. Metaxas, "Pose-free Facial Landmark Filling via Optimized Part Mixtures and Cascaded Deformable Shape Model," IEEE International Conference on Computer Vision, 2013, pp. 1944-1951.
X. Zhu and D. Ramanan, "Face Detection, Pose Estimation and Landmark Localization in the Wild," IEEE Conference on Computer Vision and Pattern Recognition, 2012, 8 pages.
G.-S. Hsu, K.-H. Chang and S.-C. Huang, "Regressive Tree Structured Model for Facial Landmark Localization," IEEE International Conference on Computer Vision, 2015, pp. 3855-3861.
A. Jourabloo and X. Liu, "Pose-Invariant 3D Face Alignment," IEEE International Conference on Computer Vision, 2015, 9 pages.
Y. Wu and Q. Ji, "Robust Facial Landmark Detection under Significant Head Poses and Occlusion," IEEE International Conference on Computer Vision, 2015, pp. 3658-3666.
X. P. Burgos-Artizzu, P. Perona and P. Dollar, "Robust face landmark estimation under occlusion," IEEE International Conference on Computer Vision, 2013, 8 pages.
L. Gu and T. Kanade, "3D Alignment of Face in a Single Image," IEEE Conference on Computer Vision and Pattern Recognition, 2006, 8 pages.
L. A. Jeni, J. F. Cohn and T. Kanade, "Dense 3D Face Alignment from 2D Videos in Real-Time," IEEE International conference and Workshops on Automatic Face and Gesture Recognition (FG), 2015, 8 pages.
S. Tulyakov and N. Sebe, "Regressing a 3D Face Shape from a Single Image," IEEE International Conference on Computer Vision, 2015, pp. 3748-3755.
Z. Zhang, P. Luo, C. C. Loy and X. Tang, "Facial Landmark Detection by Deep Multi-task Learning," European Conference on Computer Vision, 2014, 15 pages.
E. Zhou, H. Fan, Z. Cao, Y. Jiang and Q. Yin, "Extensive Facial Landmark Localization with Coarse-to-fine convolutional Network Cascade," IEEE International Conference on Computer Vision Workshops, 2013, pp. 386-391.
W. Wang, S. Tulyakov and N. Sebe, "Recurrent Convolutional Face Alignment," Asian Conference on Computer Vision, 2016, 17 pages.
S. Xiao, J. Feng, J. Xing, H. Lai, S. Yan and A. Kassim, "Robust Facial Landmark Detection via Recurrent Attentive Refinement Networks," European Conference on Computer Vision, 2016, pp. 57-72.

(56) References Cited

OTHER PUBLICATIONS

Y. Li, B. Sun, T. Wu, and Y. Wang, "Face Detection with End-to-End Integration of a ConvNet and a 3D Model," arXiv preprint arXiv:1606.00850, 2016, 16 pages.
X. Peng, R. Feris, X. Wang and D. Metaxas, "A Recurrent Encoder-Decoder Network for Sequential Face Alignment," European Conference on Computer Vision, 2016, 12 pages.
J. Yang, S. Reed, M.-H. Yang and H. Lee, "Weakly-supervised Disentangling with Recurrent Transformations for 3D View Synthesis," Advances in Neural Information Processing Systems, 11 pages.
A. Newell, K. Yang and J. Deng, "Stacked Hourglass Networks for Human Pose Estimation," arXiv preprint arXiv:1603.06937, 2016, 17 pages.
J. Wu, T. Xue, J. J. Lim, Y. Tian, J. B. Tenenbaum, A. Torralba and W. T. Freeman, "Single Image 3D Interpreter Network," arXiv preprint arXiv:1604.08685, 2016, 18 pages.
K. K. Singh and Y. J. Lee, "End-to-end localization and ranking for relative attributes," in European Conference on Computer Vision, 2016, 1 page.
D. Jayaraman and K. Grauman, "Look-ahead before you leap: end-to-end active recognition by forecasting the effect of motion," arXiv preprint arXiv:1605.00164, 2016, 1 page.
Li et al, "3D Human Pose Estimation from Monocular Images with Deep Convolutional Neural Network", Appears in Asian Conference on Computer Vision (ACCV), Singapore, 2014.
PCT International Search Report for PCT/EP2018/068734 dated Oct. 16, 2018.

\* cited by examiner

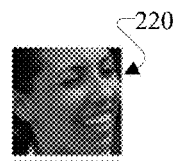
FIG. 9A
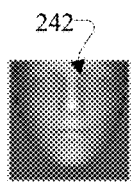 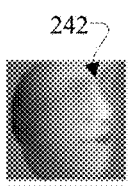 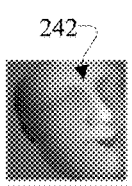 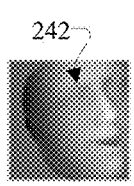 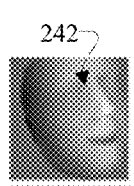 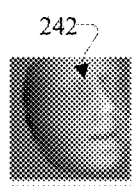 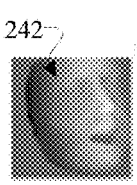
FIG. 9B    FIG. 9C    FIG. 9D    FIG. 9E    FIG. 9F    FIG. 9G    FIG. 9H
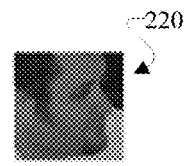
FIG. 10A
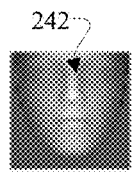 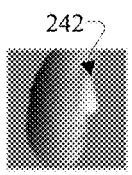 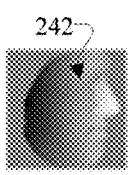 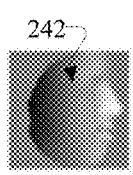 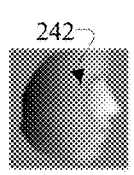 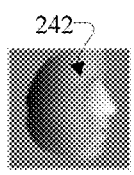 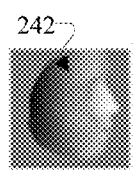
FIG. 10B    FIG. 10C    FIG. 10D    FIG. 10E    FIG. 10F    FIG. 10G    FIG. 10H
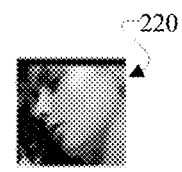
FIG. 11A
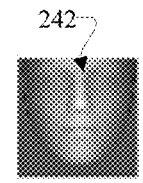 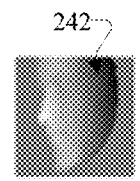 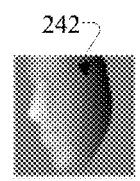 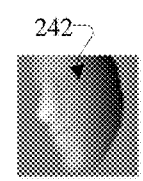 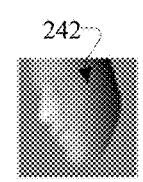 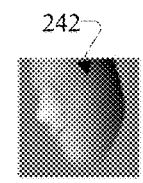 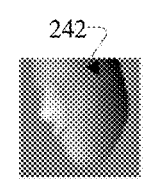
FIG. 11B    FIG. 11C    FIG. 11D    FIG. 11E    FIG. 11F    FIG. 11G    FIG. 11H

SYSTEM AND METHOD FOR POSE-INVARIANT FACE ALIGNMENT

FIELD OF THE INVENTION

This disclosure relates to systems and methods for face alignment.

BACKGROUND

In general, face alignment technologies, which are implemented with cascades of Convolutional Neural Networks (CNNs), experience at least the following drawbacks: lack of end-to-end training, hand-crafted feature extraction, and slow training speed. For example, without end-to-end training, the CNNs cannot be optimized jointly, thereby leading to a sub-optimal solution. In addition, these type of face alignment technologies often implement simple hand-crafted feature extraction methods, which do not take into account various facial factors, such as pose, expression, etc. Moreover, these cascades of CNNs typically have shallow frameworks, which are unable to extract deeper features by building upon the extracted features of early-stage CNNs. Furthermore, training for these CNNs is usually time-consuming because each of the CNNs is trained independently and sequentially and also because hand-crafted feature extraction is required between two consecutive CNNs.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a computing system includes a processing system with at least one processing unit. The processing system is configured to execute a face alignment method upon receiving image data with a facial image. The processing system is configured to apply a neural network to the facial image. The neural network is configured to provide a final estimate of parameter data for the facial image based on the image data and an initial estimate of the parameter data. The neural network includes at least one visualization layer, which is configured to generate a feature map based on a current estimate of the parameter data. The parameter data includes head pose data and face shape data.

In an example embodiment, a computer-implemented method includes receiving image data with a facial image. The computer-implemented method includes implementing a neural network to provide a final estimate of parameter data for the facial image based on the image data and an initial estimate of the parameter data. The neural network includes at least one visualization layer, which is configured to generate a feature map based on a current estimate of the parameter data. The parameter data includes head pose data and face shape data.

In an example embodiment, non-transitory computer-readable media comprises at least computer-readable data that, when executed by a processing system with at least one processing unit, performs a method that includes receiving image data with a facial image. The method includes implementing a neural network to provide a final estimate of parameter data for the facial image based on the image data and an initial estimate of the parameter data. The neural network includes at least one visualization layer, which is configured to generate a feature map based on a current estimate of the parameter data. The parameter data includes head pose data and face shape data.

These and other features, aspects, and advantages of the present invention are further clarified by the following detailed description of certain exemplary embodiments in view of the accompanying drawings throughout which like characters represent like parts.

BRIEF DESCRIPTION OF THE DRAWINGS

FIG. 9A is an example of image data according to an example embodiment of this disclosure.

FIG. 9B is an example of an initialization of a visualization layer according to an example embodiment of this disclosure.

FIG. 9C is an example of visualization data of a visualization layer associated with a first visualization block of a CNN according to an example embodiment of this disclosure.

FIG. 9D is an example of visualization data of a visualization layer associated with a second visualization block of a CNN according to an example embodiment of this disclosure.

FIG. 9E is an example of visualization data of a visualization layer associated with a third visualization block of a CNN according to an example embodiment of this disclosure.

FIG. 9F is an example of visualization data of a visualization layer associated with a fourth visualization block of a CNN according to an example embodiment of this disclosure.

FIG. 9G is an example of visualization data of a visualization layer associated with a fifth visualization block of a CNN according to an example embodiment of this disclosure.

FIG. 9H is an example of visualization data of a visualization layer associated with a sixth visualization block of a CNN according to an example embodiment of this disclosure.

FIG. 10A is an example of image data according to an example embodiment of this disclosure.

FIG. 10B is an example of an initialization of a visualization layer according to an example embodiment of this disclosure.

FIG. 10C is an example of visualization data of a visualization layer associated with a first visualization block of a CNN according to an example embodiment of this disclosure.

FIG. 10D is an example of visualization data of a visualization layer associated with a second visualization block of a CNN according to an example embodiment of this disclosure.

FIG. 10E is an example of visualization data of a visualization layer associated with a third visualization block of a CNN according to an example embodiment of this disclosure.

FIG. 10F is an example of visualization data of a visualization layer associated with a fourth visualization block of a CNN according to an example embodiment of this disclosure.

FIG. 10G is an example of visualization data of a visualization layer associated with a fifth visualization block of a CNN according to an example embodiment of this disclosure.

FIG. 10H is an example of visualization data of a visualization layer associated with a sixth visualization block of a CNN according to an example embodiment of this disclosure.

FIG. 11A is an example of image data according to an example embodiment of this disclosure.

FIG. 11B is an example of an initialization of a visualization layer according to an example embodiment of this disclosure.

FIG. 11C is an example of visualization data of a visualization layer associated with a first visualization block of a CNN according to an example embodiment of this disclosure.

FIG. 11D is an example of visualization data of a visualization layer associated with a second visualization block of a CNN according to an example embodiment of this disclosure.

FIG. 11E is an example of visualization data of a visualization layer associated with a third visualization block of a CNN according to an example embodiment of this disclosure.

FIG. 11F is an example of visualization data of a visualization layer associated with a fourth visualization block of a CNN according to an example embodiment of this disclosure.

FIG. 11G is an example of visualization data of a visualization layer associated with a fifth visualization block of a CNN according to an example embodiment of this disclosure.

FIG. 11H is an example of visualization data of a visualization layer associated with a sixth visualization block of a CNN according to an example embodiment of this disclosure.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
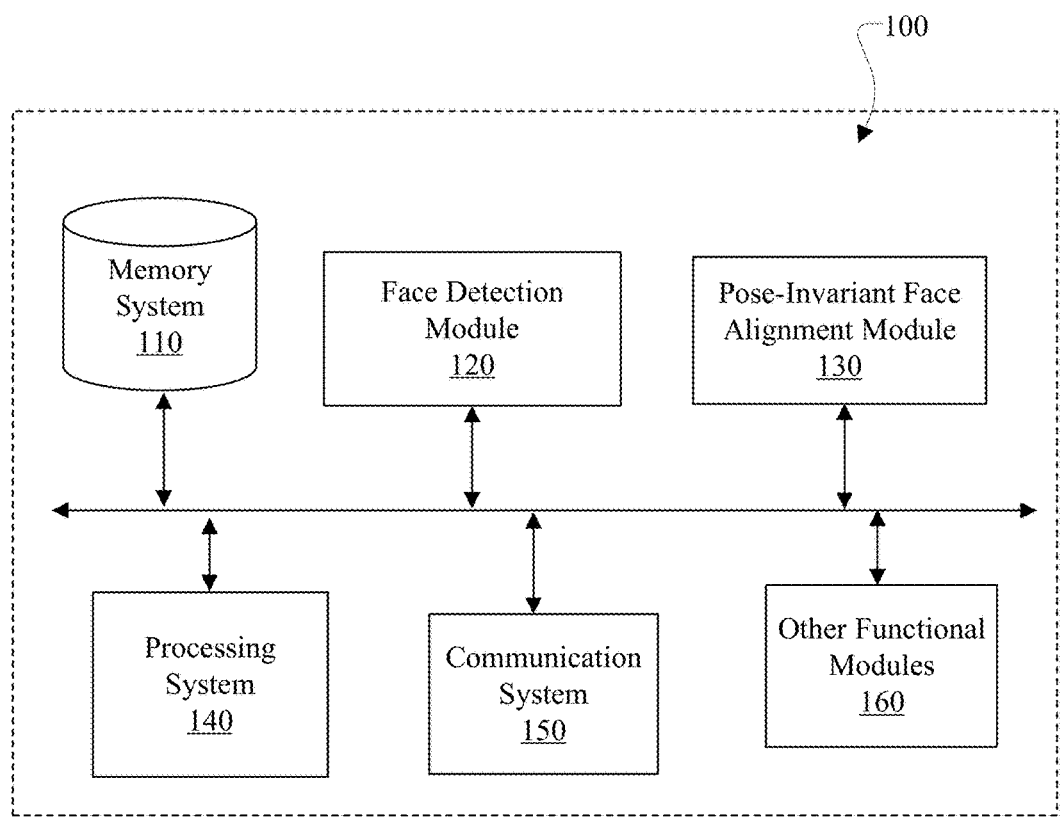
FIG. 1 is a block diagram of a system according to an example embodiment of this disclosure.

FIG. 1 is a block diagram of a computer system 100 configured to implement pose-invariant face alignment. In this regard, the computer system 100 includes various software and hardware components. For example, the computer system 100 includes at least a memory system 110, a face detection module 120, a pose-invariant face alignment module 130, a processing system 140, a communication system 150, and other functional modules 160. In an example embodiment, the computer system 100 is configured to implement and execute a pose-invariant face alignment method, as disclosed herein and as provided by the pose-invariant face alignment module 130. In addition, in an example embodiment, the computer system 100 is also configured to implement and execute face detection, as disclosed herein and as provided by the face detection module 120, prior to implementing and executing the pose-invariant face alignment method.

In an example embodiment, the memory system 110 includes various data, including training data and other data associated with the pose-invariant face alignment module 130. In an example embodiment, the memory system 110 is a computer or electronic storage system, which is configured to store and provide access to various data to enable at least the operations and functionality, as disclosed herein. In an example embodiment, the memory system 110 comprises a single device or a plurality of devices. In an example embodiment, the memory system 110 can include electrical, electronic, magnetic, optical, semiconductor, electromagnetic, or any suitable technology. For instance, in an example embodiment, the memory system 110 can include random access memory (RAM), read only memory (ROM), flash memory, a disk drive, a memory card, an optical storage device, a magnetic storage device, a memory module, any suitable type of memory device, or any combination thereof. In an example embodiment, with respect to the computer system 100, the memory system 110 is local, remote, or a combination thereof (e.g., partly local and partly remote). In an example embodiment, the memory system 110 can include at least a cloud-based storage system (e.g. cloud-based database system), which is remote from the other components of the computer system 100.

In an example embodiment, the face detection module 120 includes hardware, software, or a combination thereof. In an example embodiment, the face detection module 120 is at least configured to receive an image, identify a facial image within the image, and provide image data 220 relating to the facial image. In an example embodiment, the processing system 140 includes at least a central processing unit (CPU), a graphics processing unit (GPU), a Field-Programmable Gate Array (FPGA), an Application-Specific Integrated Circuit (ASIC), a System-on-a-chip system (SOC), a programmable logic device (PLD), any suitable computing technology, or any combination thereof.

In an example embodiment, the communication system 150 includes suitable communications technology that enables any suitable combination of components of the computer system 100 to communicate with each other. In an example embodiment, the communication system 150 includes wired-based technology, wireless-based technology, and/or a combination thereof. In an example embodiment, the communication system 150 includes a wired network, a wireless network, or a combination thereof. In an example embodiment, the communication system 150 includes any suitable type of computer network and/or architecture. In an example embodiment, the communication system 150 includes a connection to the Internet.

In an example embodiment, the other functional modules 160 include hardware, software, or a combination thereof. For instance, the other functional modules 28 include logic circuitry, an operating system, I/O devices (e.g., a display, etc.), other computer technology, or any combination thereof. More specifically, in an example embodiment, the other functional modules 28 enable the pose-invariant face alignment module 130 to operate and function, as disclosed herein. In an example embodiment, the other functional modules 160 include a camera and/or optical system. In this regard, the camera and/or optical system is configured to provide an image to the face detection module 120 and/or the processing system 140 such that image data 220 is provided to the pose-invariant face alignment module 130. Also, in an example embodiment, the other functional modules 160 includes a facial analysis module, such as a face recognition module, an expression estimation module, a 3D face reconstruction module, any suitable facial analysis module, or any combination thereof. In this regard, the facial analysis module is configured to perform facial analysis in accordance with output, such as a final estimation of parameter data relating to the facial image, from the CNN 200.

Figure 2:
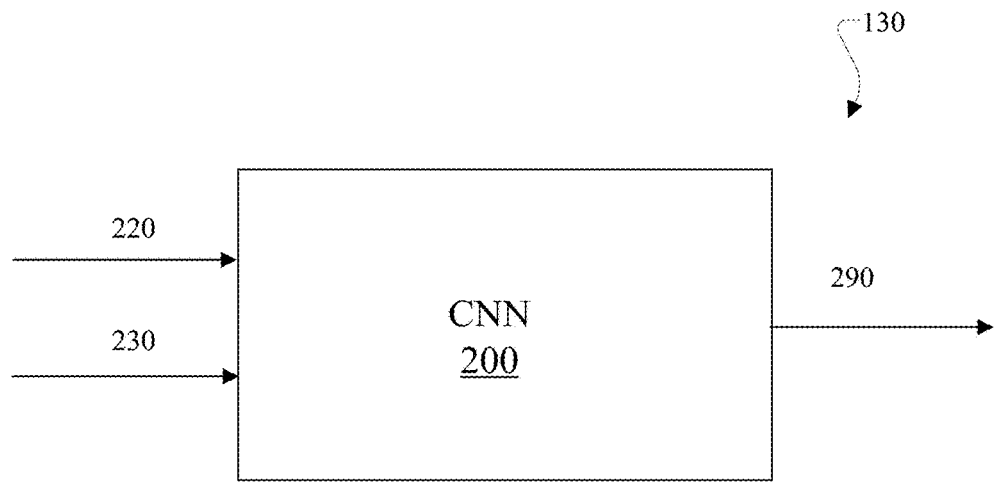
FIG. 2 illustrates a pose-invariant face alignment module of the system of FIG. 1 according to an example embodiment of this disclosure.

FIG. 2 illustrates a pose-invariant face alignment module 130 according to an example embodiment. In an example embodiment, the pose-invariant face alignment module 130 includes a single CNN 200. In an example embodiment, this CNN 200 is configured to receive at least image data 220 and a set of parameters 230 as input. Upon receiving the image data 220 (i.e., a single facial image with an arbitrary head pose) from the face detection module 120 and upon obtaining a set of parameters 230, the pose-invariant face alignment module 130 is configured to estimate the 2D landmarks with their visibility labels by fitting a 3D face model. In this regard, the pose-invariant face alignment module 130 includes a single CNN 200 with end-to-end training for model fitting.

Figure 3:
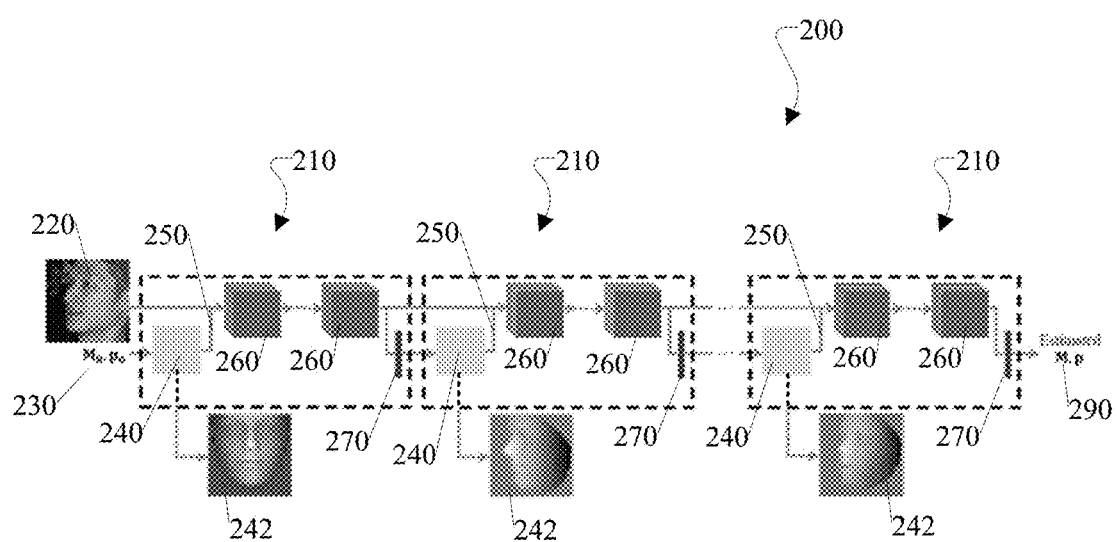
FIG. 3 is a block diagram of the architecture of the CNN of FIG. 2 according to an example embodiment of this disclosure.

FIG. 3 illustrates an example architecture of the CNN 200 according to an example embodiment. As shown, the CNN 200 includes a plurality of connected visualization blocks 210. For instance, as a non-limiting example, the CNN 200 includes at least six visualization blocks 210. In this regard, the CNN 200 includes any suitable number of visualization blocks 210 that provides the desired results. In an example embodiment, the inputs include image data 220 and an initial estimation of at least one parameter, e.g. parameter $P^0$, and the output is the final estimation 290 of the set of parameters. Compared to a related system with a cascade of CNN 200s, due to the joint optimization of all visualization blocks 210 with backpropagation of the loss functions, the pose-invariant face alignment module 130 has a CNN 200 with an architecture, which is able to converge in substantially fewer epochs during training.

In an example embodiment, the system 100 includes a 3D Morphable Model (3DMM). In an example embodiment, the memory system 110 (e.g., training data), the pose-invariant face alignment module 130, or a combination thereof includes the 3DMM. In an example embodiment, the 3DMM represents the 3D shape of a face. More specifically, 3DMM represents a 3D face $S_p$ as a linear combination of mean shape $S_0$, identity bases $S^I$ and expression bases $S^E$ via the following equation:

$$S_p = S_0 + \sum_{k}^{N_I} p_k^I S_k^I + \sum_{k}^{N_E} p_k^E S_k^E \qquad \text{[Equation 1]}$$

In an example embodiment, the pose-invariant face alignment module 130 uses a vector $p=[p^I, p^E]$ for the 3D shape parameters, where $p^I=[p_0^I, \ldots, p_{N_I}^I]$ are the identity parameters and $p^E=[p_0^E, \ldots, p_{N_E}^E]$ are the expression parameters. In an example embodiment, the pose-invariant face alignment module 130 uses a Basel 3D face model, which has 199 bases, as identity bases and the face warehouse model with 29 bases as the expression bases. In this case, each 3D face shape comprises a set of Q 3D vertexes:

$$S_p = \begin{bmatrix} x_1^p & x_2^p & \ldots & x_Q^p \\ y_1^p & y_2^p & \ldots & y_Q^p \\ z_1^p & z_2^p & \ldots & z_Q^p \end{bmatrix} \qquad \text{[Equation 2]}$$

In an example embodiment, the 2D face shapes are the projection of 3D shapes. In an example embodiment, the weak perspective projection model is used with 6 degrees of freedoms, i.e., one for scale, three for rotation angles, and two for translations, which projects the 3D face shape $S_p$ onto 2D images to obtain the 2D shape U as expressed by the following equation:

$$U = f(P) = M \begin{pmatrix} S_{p(:,b)} \\ 1 \end{pmatrix}, \text{ where} \qquad \text{[Equation 3]}$$

$$M = \begin{bmatrix} m_1 & m_2 & m_3 & m_4 \\ m_5 & m_6 & m_7 & m_8 \end{bmatrix} \text{ and} \qquad \text{[Equation 4]}$$

$$U = \begin{pmatrix} x_1^t & x_2^t & \ldots & x_N^t \\ y_1^t & y_2^t & \ldots & y_N^t \end{pmatrix} \qquad \text{[Equation 5]}$$

In this case, U collects a set of N 2D landmarks, M is the camera projection matrix, with misuse of notation P={M, p}, and the N-dim vector b includes 3D vertex indexes which are semantically corresponding to 2D landmarks. In an example embodiment, $m_1=[m_1\ m_2\ m_3]$ and $m_2=[m_5\ m_6\ m_7]$ denote the first two rows of the scaled rotation component, while $m_4$ and $m_8$ are the translations.

Equation 3 establishes the relationship, or equivalency, between 2D landmarks U and P, i.e., 3D shape parameters p and the camera projection matrix M. Given that almost all the training images for face alignment have only 2D labels, i.e., U, the processing system 140 perform a data augmentation step to compute their corresponding P. Given image data 220, the pose-invariant face alignment module 130 is configured to estimate the parameter P, based on which the 2D landmarks and their visibilities can be derived.

Figure 4:
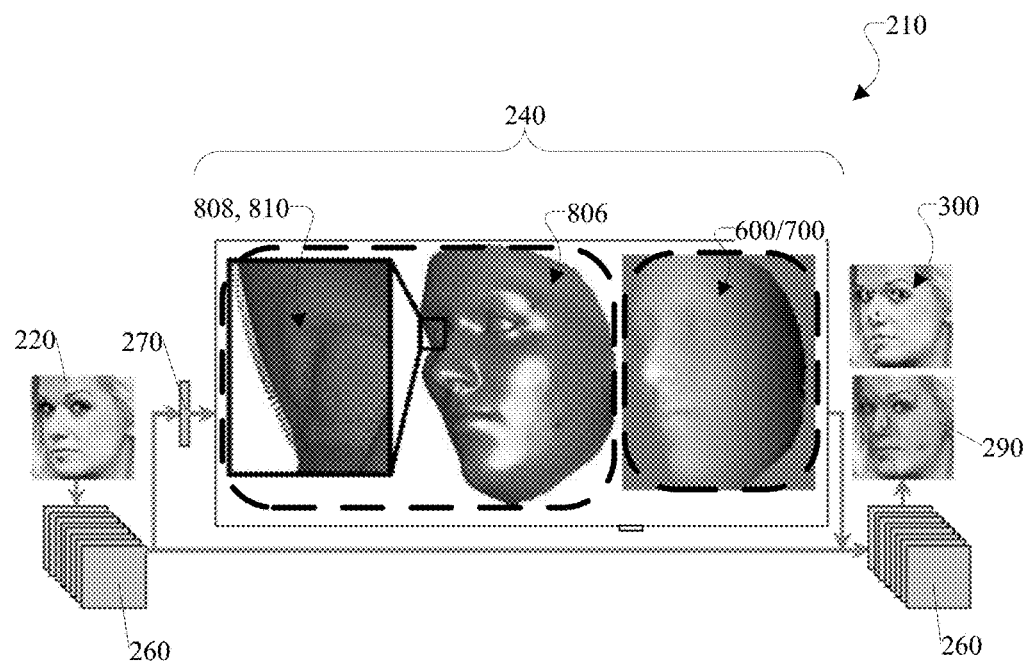
FIG. 4 is a conceptual diagram of a visualization block according to an example embodiment of this disclosure.
Figure 8:
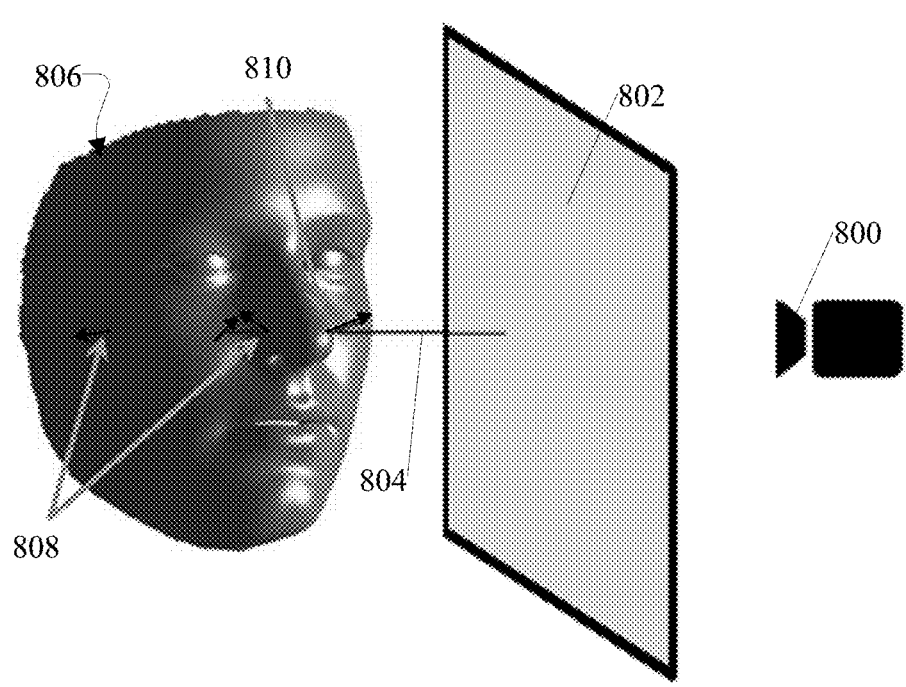
FIG. 8 illustrates an example of selecting a desired surface point during projection based on surface normal vectors for a 3D object according to an example embodiment of this disclosure.

FIG. 4 illustrates a conceptual diagram of a visualization block 210 according to an example embodiment. As shown in FIG. 4, the visualization block 210 includes a visualization layer 240, which reconstructs the 3D face shape from the estimated parameters inside the CNN 200 and synthesizes a 2D image via the surface normal vectors 808/810 of visible vertexes. In an example embodiment, the visualization layer 240 visualizes the alignment result of the previous visualization block 210 and utilizes it for the current visualization block 210. In an example embodiment, the visualization layer 240 is derived from the surface normals 808/810 of the underlying 3D face model 806 and encodes the relative pose between a face and a camera (FIG. 8). Also, in an example embodiment, the visualization layer 240 is differentiable, which allows the gradient to be computed analytically, thereby enabling end-to-end training of the CNN 200. Furthermore, as shown in FIG. 4, the visualization layer 240 utilizes a mask 600/700 to differentiate between pixels in the middle and contour parts of a facial image and to also make the pixel value of the visualized images similar across different poses. Moreover, as shown in FIG. 4, the final estimate 290 of the parameters of the facial image, as provided by the last visualization block 210 of the CNN 200, can be provided to a facial analysis module to obtain facial landmark detection results 300.

Figure 5:
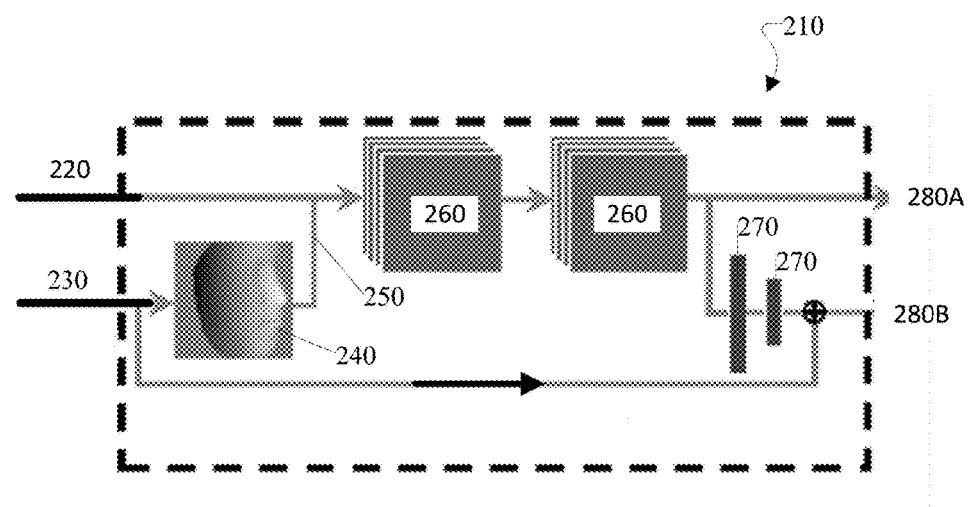
FIG. 5 is an example diagram of an architecture of a visualization block according to an example embodiment of this disclosure.

FIG. 5 illustrates a visualization block 210 of the CNN 200 according to an example embodiment. As aforementioned, each visualization block 210 includes a visualization layer 240 that is based on the latest parameter estimation. In this regard, each visualization layer 240 serves as a bridge between consecutive visualization blocks 210. In an example embodiment, each visualization layer 240 generates a feature map 250 based on the current estimated, or input, parameter P. Each convolutional layer 260 is followed by a batch normalization (BN) layer and a rectified linear units (ReLU) layer. Each convolutional layer 260 extracts deeper features based on input features provided by the previous visualization block 210 and the visualization layer 240. Between the two fully connected layers 270, the first convolutional layer 260 is followed by a ReLU layer and a dropout layer, while the second convolutional layer 260 simultaneously estimates the update of M and p, ΔP. In an example embodiment, the outputs of the visualization block 210 include output data 280A and a new estimation (or current estimation) 280B of the parameters 230, for example, when adding ΔP to the input P. In FIG. 5, the output data 280A includes deeper features and the image data 220. In an alternative example embodiment, the output data 280A includes deeper features. In another alternative example embodiment, the output data 280A includes the image data 220. In an example embodiment, as shown in FIG. 5, basically the top part of the visualization block 210 focuses on learning deeper features, while the bottom part utilizes such features to estimate the parameters 230 in a ResNet-like structure. During a backward pass of the training phase, the visualization block 210 backpropagates the loss through both of its inputs to adjust the convolutional layers 260 and fully connected layers 270 in the previous visualization blocks 210. This operation allows the visualization block 210 to extract better features that are suitable for the next visualization block 210 and improve the overall parameter estimation.

In an example embodiment, the CNN 200 is configured to employ at least two types of loss functions. In this case, for example, the first type of loss function is a Euclidean loss between the estimation and the target of the parameter update, with each parameter weighted separately as expressed by following equation:

$$E_P^i = (\Delta P^i - \Delta \overline{P}^i)^T W (\Delta P^i - \Delta \overline{P}^i)^T \qquad \text{[Equation 6]}$$

where $E_P^i$ is the loss, $\Delta P^i$ is the estimation and $\Delta \overline{P}^i$ is the target (or ground truth) at the i-th visualization block 210. In this equation, the diagonal matrix W contains the weights. For each element of the shape parameter p, its weight is the inverse of the standard deviation that was obtained from the data used in 3DMM training. To compensate the relative scale among the parameters of M, the processing system 140 computes the ratio r between the average of scaled rotation parameters and average of translation parameters in the training data. In this regard, the weights of the scaled rotation parameters of M are set to $$\frac{1}{r}$$

and the weights of the translation of M are set to 1. In addition, the second type of loss function is the Euclidean loss on the resultant 2D landmarks as expressed by the following equation:

$$E_S^i = \|f(P^i - \Delta P^i) - \overline{U}\|^2 \qquad \text{[Equation 7]}$$

where $\overline{U}$ is the ground truth 2D landmarks, and $P^i$ is the input parameter to the i-th block, i.e., the output of the i−1-th block. In this regard, f (•) computes 2D landmark locations using the currently updated parameters via Equation 3. In an example embodiment, for backpropagation of this loss function to the parameter ΔP, the chain rule is used to compute the gradient, as expressed by the following equation:

$$\frac{\partial E_S^i}{\partial \Delta P^i} = \frac{\partial E_S^i}{\partial f} \frac{\partial f}{\partial \Delta P^i} \qquad \text{[Equation 8]}$$

In an example embodiment, for the first three visualization blocks 210 of the CNN 200, the Euclidean loss on the parameter updates (Equation 6) is used, while the Euclidean loss on 2D landmarks (Equation 7) is applied to the last three blocks of the CNN 200. The first three blocks estimate parameters to align 3D shape to the face image roughly and the last three blocks leverage the good initialization to estimate the parameters and the 2D landmark locations more precisely.

In an example embodiment, the visualization layer 240 is based on surface normals of the 3D face that provide surface orientations in local neighborhoods. In an example embodiment, the processing system 140 uses the z coordinate of surface normals of each vertex transformed with the pose. In this regard, the z coordinate is an indicator of a "frontability" of a vertex, i.e., the amount that the surface normal is pointing towards a camera 800. This quantity is used to assign an intensity value at its projected 2D location to construct visualization data 242 (e.g., a visualization image). In an example embodiment, the frontability measure g, a Q-dim vector, can be computed via the following equation:

$$g = \max\left(0, \frac{(m_1 \times m_2)}{\|m_1\|\|m_2\|} N_0\right) \qquad \text{[Equation 9]}$$

where × is the cross product, and $\|\cdot\|$ denotes the $L_2$ norm. The 3×Q matrix $N_0$ is the surface normal vectors of a 3D face shape. To avoid the high computational cost of computing the surface normals after each shape update, the processing system 140 approximates $N_0$ as the surface normals of the mean 3D face.

In an example embodiment, both the face shape and head pose are still continuously updated across various visualization blocks 210, and are used to determine the projected 2D location. Hence, this approximation would only slightly affect the intensity value. To transform the surface normal based on the head pose, the processing system 140 applies the estimation of the scaled rotation matrix ($m_1$ and $m_2$) to the surface normals computed from the mean face. The value is then truncated with the lower bound of 0, as shown in Equation 9. The pixel intensity of a visualized image V(u,v) is computed as the weighted average of the frontability measures within a local neighbourhood as expressed by the following equation:

$$V(u, v) = \frac{\sum_{q \in D(u,v)} g(q)a(q)w(u, v, x_q^t, y_q^t)}{\sum_{q \in D(u,v)} w(u, v, x_q^t, y_q^t)} \quad \text{[Equation 10]}$$

where D (u, v) is the set of indexes of vertexes whose 2D projected locations are within the local neighborhood of the pixel (u, v). $(x_q^t, y_q^t)$ is the 2D projected location of q-th 3D vertex. The weight w is the distance metric between the pixel (u, v) and the projected location $(x_q^t, y_q^t)$, $$w(u, v, x_q^t, y_q^t) = \exp\left(-\frac{(u - x_q^t)^2 + (v - y_q^t)^2}{2\sigma^2}\right) \quad \text{[Equation 11]}$$

In addition, a is a Q-dim mask vector with positive values for vertexes in the middle area of the face and negative values for vertexes around the contour area of the face as expressed by the following equation:

$$a(q) = \exp\left(-\frac{(x^n - x_q^p)^2 + (y^n - y_q^p)^2 + (z^n - z_q^p)}{2\sigma^2}\right), \quad \text{[Equation 12]}$$

where $(x^n; y^n; z^n)$ is the vertex coordinate of the nose tip.

Also, in this equation, a(q) is pre-computed and normalized for zero-mean and unit standard deviation. In an example embodiment, the processing system 140 uses the mask 600 to discriminate between the central and boundary areas of the face, as well as to increase similarity across visualization of different faces.

In an example embodiment, to allow backpropagation of the loss functions through the visualization layer 240, the processing system 140 computes the derivative of V with respect to the elements of the parameters M and p. In this regard, the processing system 140 computes the partial derivatives, $$\frac{\partial g}{\partial m_k}, \frac{\partial w(u, v, x_i^t, y_i^t)}{\partial m_k}, \text{ and } \frac{\partial w(u, v, x_i^t, y_i^t)}{\partial p_j}.$$

In an example embodiment, the processing system 140 then computes the derivatives of $$\frac{\partial V}{\partial m_k} \text{ and } \frac{\partial V}{\partial p_j}$$

based on Equation 10.

Figure 6:
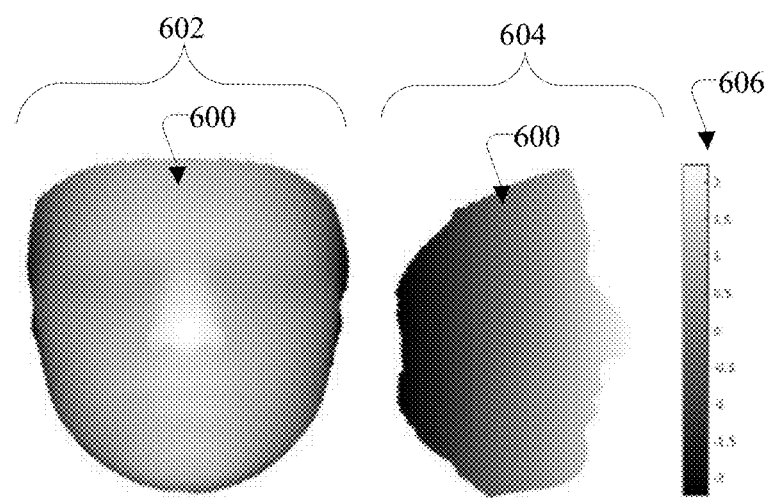
FIG. 6 illustrates an example of a mask according to an example embodiment of this disclosure.

FIG. 6 illustrates two views of a visualization of an exemplary mask 600 according to an example embodiment. Specifically, FIG. 6 includes a frontal view 602 of the mask 600 and a side view 604 (or profile view) of the mask 600. In this case, the mask 600 is expressed, for instance, by at least Equation 12. As shown in FIG. 6, the mask 600, as expressed by a(q), has positive values in the middle area and negative values in the contour area, as indicated by the scale 606.

Figure 7:
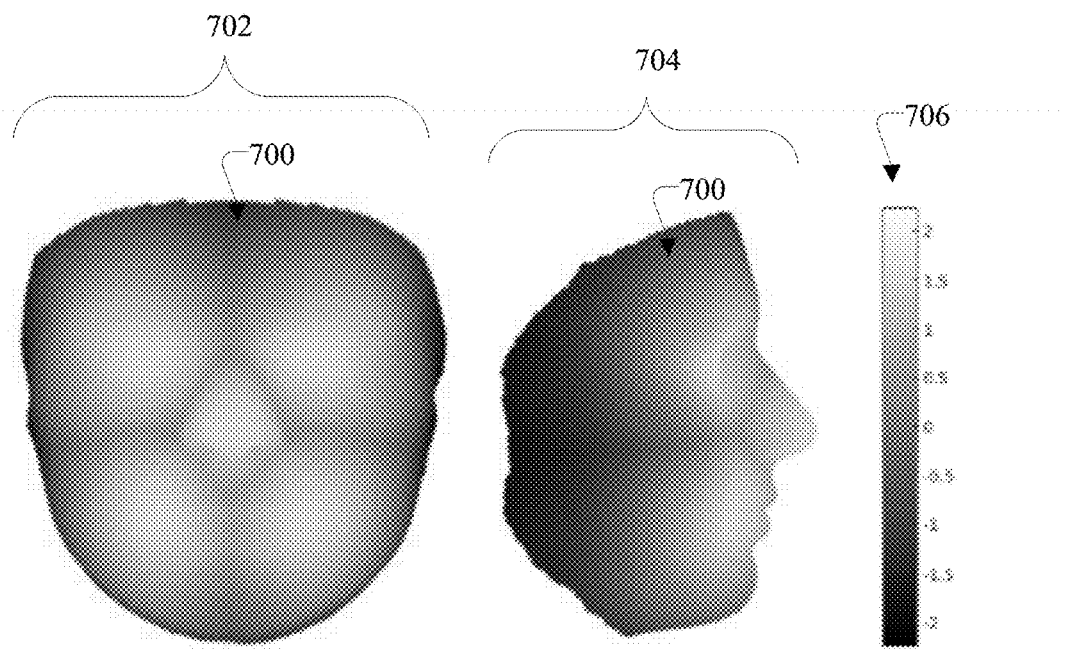
FIG. 7 illustrates an example of a mask according to an alternative example embodiment of this disclosure.

FIG. 7 illustrates another example of a mask 700 according to an alternative example embodiment. Specifically, FIG. 7 includes a frontal view 702 of the mask 700 and a side view 704 (or profile view) of the mask 700. In this example, the mask 700 has five positive areas, which include the two eye areas, the nose tip area, and the two lip corner areas, as indicated by the scale 706. Also, in this example, the values are normalized to zero-mean and unit standard deviation. In this regard, the mask 700 makes the pixel value of visualized images to be similar for faces with different poses and discriminates between the middle-area and contour-areas of the face. The mask 700 of FIG. 7 is more complex and conveys more information about the informative facial areas compared to that provided by the mask 600 of FIG. 6.

FIG. 8 illustrates a position of a camera 800 relative to an image plane 802 with a plurality of pixels. In addition, FIG. 8 shows a pixel axis 804 that extends along an image pixel of the image plane 802 together with a visualization of a human facial image of the image plane 802 as a 3D object 806. FIG. 8 also includes surface normal vectors with negative z coordinates, as pointed out at arrow 808, and a surface normal vector with a positive z coordinate and smaller depth, as pointed out by arrow 810. In this regard, visualizing the human face as a 3D object 806 at an arbitrary view angle requires the estimation of the visibility of each 3D vertex. To avoid the computationally expensive visibility test via rendering, the processing system 140 is configured to implement at least two strategies for approximation. As one strategy, for example, the processing system 140 is configured to prune the vertexes whose frontability measures g equal to 0, i.e., the vertexes pointing against the camera 800. Secondly, if multiple vertexes project to a same image pixel via the pixel axis 804, the processing system 140 is configured to keep only the one with the smallest depth values, as indicated, for example, by arrow 810 in FIG. 8.

FIG. 9A is an example of image data 220 according to an example embodiment. As shown in FIG. 9A, in this example, the image data 220 includes at least a large face pose with an open-mouth expression (e.g., a smile). FIG. 9B is an example of an initialization of a visualization layer 240 according to an example embodiment. FIG. 9C is an example of visualization data 242 of a visualization layer 240 associated with a first visualization block 210 of a CNN 200 according to an example embodiment. FIG. 9D is an example of visualization data 242 of a visualization layer 240 associated with a second visualization block 210 of a CNN 200 according to an example embodiment. FIG. 9E is an example of visualization data 242 of a visualization layer 240 associated with a third visualization block 210 of a CNN 200 according to an example embodiment. FIG. 9F is an example of visualization data 242 of a visualization layer 240 associated with a fourth visualization block 210 of a CNN 200 according to an example embodiment. FIG. 9G is an example of visualization data 242 of a visualization layer 240 associated with a fifth visualization block 210 of a CNN 200 according to an example embodiment. FIG. 9H is an example of visualization data 242 of a visualization layer 240 associated with a sixth visualization block 210 of a CNN 200 according to an example embodiment of this disclosure. As progressively shown in FIGS. 9C-9H, the pose-invariant face alignment module 130 is able to recover the expression and the head pose of the facial image of the image data 220, as shown in FIG. 9A. In an example embodiment, the pose-invariant face alignment module 130 is able to provide these results at least by extracting deeper features and employing the backpropagation of loss functions.

FIG. 10A is an example of image data 220 according to an example embodiment of this disclosure. As shown in FIG. 10A, in this example, the image data 220 includes at least a large face pose with a relatively neutral expression. FIG. 10B is an example of an initialization of a visualization layer 240 according to an example embodiment of this disclosure. FIG. 10C is an example of visualization data 242 of a visualization layer 240 associated with a first visualization block 210 of a CNN 200 according to an example embodiment of this disclosure. FIG. 10D is an example of visualization data 242 of a visualization layer 240 associated with a second visualization block 210 of a CNN 200 according to an example embodiment of this disclosure. FIG. 10E is an example of visualization data 242 of a visualization layer 240 associated with a third visualization block 210 of a CNN 200 according to an example embodiment of this disclosure. FIG. 10F is an example of visualization data 242 of a visualization layer 240 associated with a fourth visualization block 210 of a CNN 200 according to an example embodiment. FIG. 10G is an example of visualization data 242 of a visualization layer 240 associated with a fifth visualization block 210 of a CNN 200 according to an example embodiment. FIG. 10H is an example of visualization data 242 of a visualization layer 240 associated with a sixth visualization block 210 of a CNN 200 according to an example embodiment. As progressively shown in FIGS. 10C-10H, the pose-invariant face alignment module 130 is able to recover the expression and the head pose of the facial image of the image data 220, as shown in FIG. 10A. In an example embodiment, the pose-invariant face alignment module 130 is able to provide these results at least by extracting deeper features and employing the backpropagation of loss functions.

FIG. 11A is an example of image data 220 according to an example embodiment of this disclosure. As shown in FIG. 11A, in this example, the image data 220 includes at least a large face pose with a relatively neutral expression. Also, the image data 220 of FIG. 11A includes a side of a face that is different than a side of a face that is included in the image data 220 of FIG. 10A. FIG. 11B is an example of an initialization of a visualization layer 240 according to an example embodiment. FIG. 11C is an example of visualization data 242 of a visualization layer 240 associated with a first visualization block 210 of a CNN 200 according to an example embodiment. FIG. 11D is an example of visualization data 242 of a visualization layer 240 associated with a second visualization block 210 of a CNN 200 according to an example embodiment. FIG. 11E is an example of visualization data 242 of a visualization layer 240 associated with a third visualization block 210 of a CNN 200 according to an example embodiment. FIG. 11F is an example of visualization data 242 of a visualization layer 240 associated with a fourth visualization block 210 of a CNN 200 according to an example embodiment. FIG. 11G is an example of visualization data 242 of a visualization layer 240 associated with a fifth visualization block 210 of a CNN 200 according to an example embodiment. FIG. 11H is an example of visualization data 242 of a visualization layer 240 associated with a sixth visualization block 210 of a CNN 200 according to an example embodiment. As progressively shown in FIGS. 11C-11H, the pose-invariant face alignment module 130 is able to recover the expression and the head pose of the facial image of the image data 220, as shown in FIG. 11A. In an example embodiment, the pose-invariant face alignment module 130 is able to provide these results at least by extracting deeper features and employing the backpropagation of loss functions.

As described above, the system 100 includes a number of advantageous features. For example, the system 100 is configured to implement a large-pose face alignment method with end-to-end training via a single CNN 200. In addition, the CNN 200 includes at least one differentiable visualization layer 240, which is integrated into the neural network, i.e. the CNN 200, and enables joint optimization by back-propagating the error from at least one later visualization block 210 to at least one earlier visualization block 210. In addition, the system 100 is configured such that each visualization block 210 is enabled to extract deeper features by utilizing the extracted features from previous visualization blocks 210 without the need to extract hand-crafted features. Also, the pose-invariant alignment method converges faster during the training phase compared to that provided by a related system involving a cascade of CNNs. In this regard, for example, one of the main advantages of end-to-end training of a single CNN 200 is the reduced training time. In addition, the CNN 200 includes at least one visualization layer 240, which is differentiable and encodes the face geometry details via surface normals. Moreover, the pose-invariant face alignment module 130 is enabled to guide the CNN 200 to focus on the face area that incorporates both the pose and expression information. Furthermore, the CNN 200 can be configured to achieve greater levels of precision and accuracy by simply increasing the number of visualization blocks 210 in its architecture.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computing system comprising a processing system with at least one processing unit, the processing system being configured to execute a face alignment method that includes:
 receiving image data associated with a facial image; and
 implementing a neural network to provide a final estimate of parameter data for the facial image based on the image data and an initial estimate of the parameter data, the neural network being configured to generate a feature map based on a current estimate of the parameter data,
 wherein:
  the neural network is a single convolutional neural network with a plurality of visualization blocks that are connected;
  each visualization block includes at least a visualization layer, convolutional layers, and fully connected layers; and the parameter data includes head pose data and face shape data.

2. The computing system of claim 1, further comprising:
a face detection module configured to at least (i) receive an image, (ii) identify the facial image within the image, and (iii) provide the image data relating to the facial image to the processing system,
wherein the facial image provides a facial view that is within a range of a frontal view to a profile view.

3. The computing system of claim 1, wherein the face shape data includes facial identity parameters and facial expression parameters.

4. The computing system of claim 1, wherein the single convolutional neural network includes end-to-end training for model fitting.

5. The computing system of claim 1, wherein each visualization layer is based on surface normals of a 3D face model and encodes a relative head pose between a face and a camera.

6. The computing system of claim 1, wherein each visualization layer utilizes a mask to differentiate between pixels in different parts of the facial image and make pixel values of visualized images similar across different head poses.

7. A computer-implemented method for face alignment comprising:
receiving image data associated with a facial image; and
implementing a neural network to provide a final estimate of parameter data for the facial image based on the image data and an initial estimate of the parameter data, the neural network including at least one visualization layer that is configured to generate a feature map based on a current estimate of the parameter data,
wherein:
each visualization layer utilizes a mask to differentiate between pixels in different parts of the facial image and make pixel values of visualized images similar across different head poses; and
the parameter data includes head pose data and face shape data.

8. The computer-implemented method of claim 7, further comprising:
performing face detection on an image that includes (i) receiving the image, (ii) identifying the facial image within the image, and (iii) providing the image data relating to the facial image to the processing system,
wherein the facial image provides a facial view that is within a range of a frontal view to a profile view.

9. The computer-implemented method of claim 7, wherein the face shape data includes facial identity parameters and facial expression parameters.

10. The computer-implemented method of claim 7, wherein the neural network is a single convolutional neural network with end-to-end training for model fitting.

11. The computer-implemented method of claim 7, wherein:
the neural network is a single convolutional neural network with a plurality of visualization blocks that are connected; and
each visualization block includes at least the visualization layer, convolutional layers, and fully connected layers.

12. The computer-implemented method of claim 7, wherein each visualization layer is based on surface normals of a 3D face model and encodes a relative head pose between a face and a camera.

13. Non-transitory computer-readable media comprising at least computer-readable data that, when executed by a processing system with at least one processing unit, performs a face alignment method that includes:
receiving image data associated with a facial image; and
implementing a neural network to provide a final estimate of parameter data for the facial image based on the image data and an initial estimate of the parameter data, the neural network being configured to generate a feature map based on a current estimate of the parameter data,
wherein:
the neural network is a single convolutional neural network with a plurality of visualization blocks that are connected;
each visualization block includes at least one visualization layer, convolutional layers, and fully connected layers; and
the parameter data includes head pose data and face shape data.

14. The non-transitory computer-readable media of claim 13, wherein the face shape data includes facial identity parameters and facial expression parameters.

15. The non-transitory computer-readable media of claim 13, wherein the single convolutional neural network includes end-to-end training for model fitting.

16. The non-transitory computer-readable media of claim 13, wherein each visualization layer is based on surface normals of a 3D face model and encodes a relative head pose between a face and a camera.

17. The non-transitory computer-readable media of claim 13, wherein each visualization layer utilizes a mask to differentiate between pixels in different parts of the facial image and make pixel values of visualized images similar across different head poses.

* * * * *